US011695773B2

(12) United States Patent
Weisshaar et al.

(10) Patent No.: US 11,695,773 B2
(45) Date of Patent: Jul. 4, 2023

(54) DISTRIBUTING DYNAMIC ACCESS CONTROL LISTS FOR MANAGING INTERACTIONS WITH A CLOUD DATACENTER (71) Applicant: salesforce.com, inc., San Francisco, CA (US)

(72) Inventors: Barrett Allen Weisshaar, Portland, OR (US); Luis Campo Giralte, Dublin (IE)

(73) Assignee: Salesforce, Inc., San Francisco, CA (US)

( * ) Notice: Subject to any disclaimer, the term of this patent is extended or adjusted under 35 U.S.C. 154(b) by 180 days.

(21) Appl. No.: 17/034,646

(22) Filed: Sep. 28, 2020

(65) Prior Publication Data
US 2022/0103559 A1 Mar. 31, 2022

(51) Int. Cl.
*H04L 9/40* (2022.01)
*H04L 67/10* (2022.01)

(52) U.S. Cl.
CPC .......... *H04L 63/101* (2013.01); *H04L 63/108* (2013.01); *H04L 67/10* (2013.01)

(58) Field of Classification Search
CPC . H04L 61/1511; H04L 61/3025; H04L 67/18; H04L 63/101; H04L 63/108; H04L 67/10
USPC ................................. 709/245–247
See application file for complete search history.

(56) References Cited

U.S. PATENT DOCUMENTS

| 5,822,434 | A | * | 10/1998 | Caronni | ................. H04L 69/18 726/1 |
| 6,182,226 | B1 | | 1/2001 | Reid et al. | |
| 8,331,362 | B2 | | 12/2012 | Shukla et al. | |
| 9,215,205 | B1 | * | 12/2015 | Smith | ................. H04L 61/1511 |
| 2009/0154348 | A1 | * | 6/2009 | Newman | ................. H04L 43/18 370/230 |
| 2009/0287720 | A1 | * | 11/2009 | Herter | ................. G06F 11/328 |
| 2016/0164826 | A1 | | 6/2016 | Riedel et al. | |

(Continued)

FOREIGN PATENT DOCUMENTS

| CN | 103559306 B | * | 6/2016 |
| EP | 2241058 B1 | | 4/2016 |

OTHER PUBLICATIONS

Crocker, D. et al., "DomainKeys Identified Mail (DKIM) Signatures," Internet Engineering Task Force (IETF), Sep. 2011, pp. 1-76.

(Continued)

*Primary Examiner* — Bryan Lee
(74) *Attorney, Agent, or Firm* — Fenwick & West LLP (57) ABSTRACT

Disclosed herein are system, method and computer readable storage medium for enabling access control to be performed on messages received in a first-party (corporate) data center from a third-party (cloud) data center. Based on a received update request from an update service in the third-party (cloud) data center, an access control system ("ACL") controller generates an ACL entry for enabling access to a first-party (corporate) data center from a system, within the third-party data center where a system configuration change was performed by a cloud platform. The ACL controller then transmits the ACL entry to one or more devices within the first-party data center, enabling access from the updated system hosted in the third-party data center.

20 Claims, 6 Drawing Sheets (56) References Cited

U.S. PATENT DOCUMENTS

2019/0081818 A1* 3/2019 Liljenstolpe ........ H04L 12/4641
2019/0281060 A1   9/2019 Klimovs et al.

OTHER PUBLICATIONS

Mockapetris, p., "Domain Names—Implementation and Specification," Network Working Group, Nov. 1987, pp. 1-55.

* cited by examiner

DISTRIBUTING DYNAMIC ACCESS CONTROL LISTS FOR MANAGING INTERACTIONS WITH A CLOUD DATACENTER

TECHNICAL FIELD

The disclosure generally relates to the field of authorizing communications between first-party and third-party (cloud) data centers.

BACKGROUND

Historically, various institutions have hosted information technology ("IT") infrastructure in their offices. In many instances, those types of setups lead to comparatively long downtimes (e.g., due to power-outages, Internet issues, and other problems). As demand for almost perfect uptime numbers grew, many institutions migrated their IT infrastructure to dedicated data centers. Dedicated data centers were expensive to maintain so some smaller institutions moved to a shared data center model where a data center would provide a secure area within a data center and other services (e.g., network services) for the institution's IT equipment. Those solutions were still not ideal because many resources were inefficiently used as smaller institutions did not need so many resources at all times. In addition, those institutions had to hire dedicated staff to manage that IT infrastructure. Issues also came up when the IT equipment had to be upgraded or swapped out. As a result, many institutions have been migrating IT infrastructure into the cloud (e.g., third-party data centers), where all hardware IT equipment is owned and managed by the cloud data center provider. Thus, the physical upgrades and migrations can happen without the institutions being involved.

During the migration process there is a need to effectively and securely communicate between the IT infrastructure within the cloud (third-party data center) and the IT infrastructure that is being migrated (first-party data center), especially when the cloud provider makes changes (e.g., Internet Protocol address updates) to equipment configurations within the cloud. In many instances, first-party data center environments are being fully open to the third-party data center environments (cloud data centers) as it is very difficult to predict whether various changes in the cloud data center (e.g., network addressing) may cause applications spanning both data centers to break. This leads to various security and efficiency issues (e.g., if a computer in the cloud data center is compromised, it can freely access the first-party data center). This disclosure describes various embodiments for secure and efficient communications between first-party and third-party (cloud) data centers.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates one embodiment of a system for enabling access control to be performed on messages received in a data center from a cloud platform.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Figure 1:
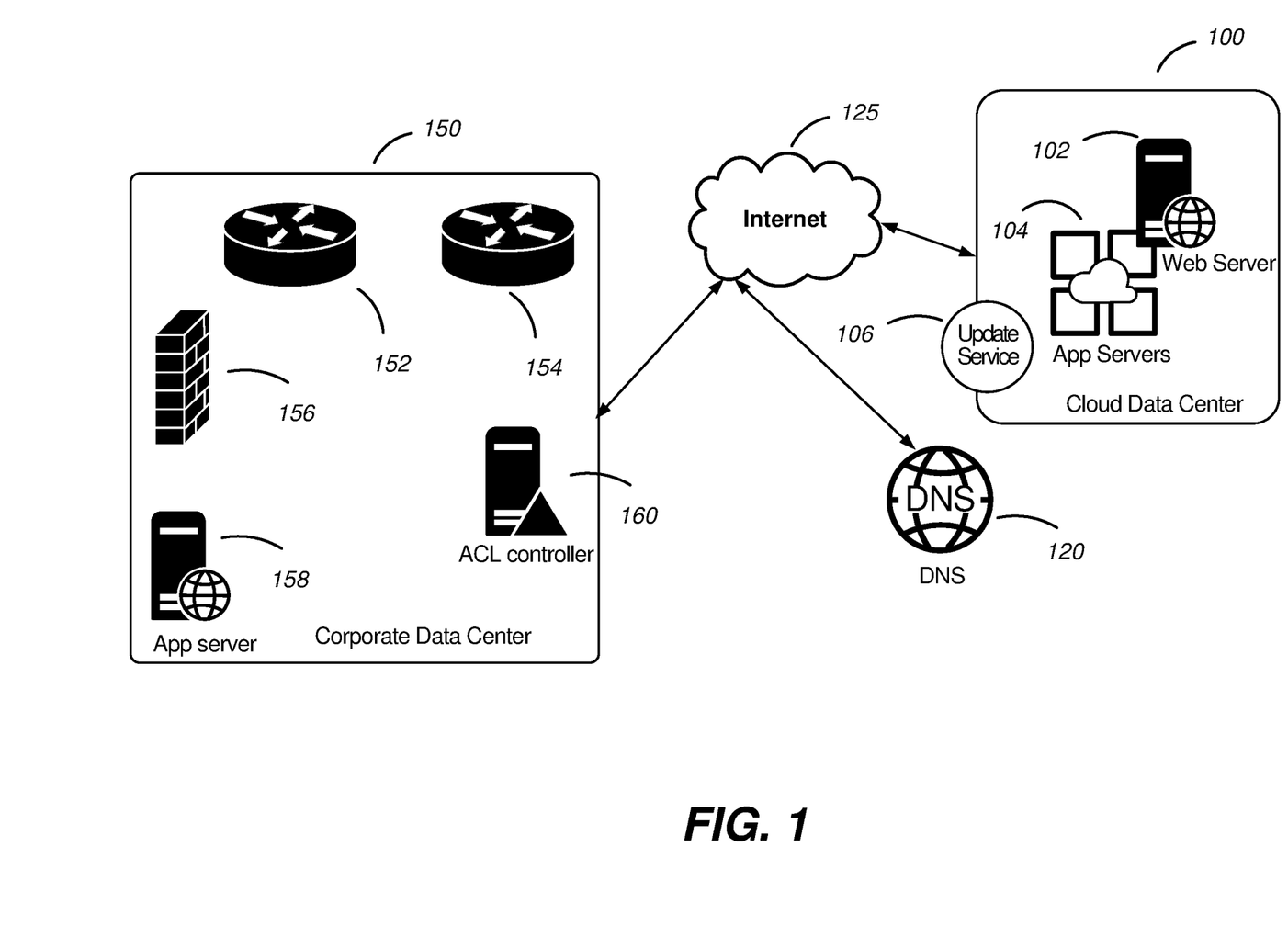

Disclosed herein are system, method and computer readable storage medium for enabling access control to be performed on messages received in a first-party (corporate) data center from a third-party (cloud) data center hosting a cloud platform. FIG. 1 illustrates cloud data center 100 run by a cloud provider and corporate data center 150 which is a data center in which an institution either owns or at least leases space and/or network connectivity for IT equipment it owns and/or leases. Services located in cloud data center 100 may be the ones that have already been migrated from corporate data center 150, while services and/or devices still located in corporate data center 150 may not have migrated yet to cloud data center 100.

Cloud data center 100 may host a number of services residing on servers within cloud data center 100 (e.g., services residing on one or more web servers 102, application servers 104, and/or other suitable servers). Those servers may execute various application services owned by the institution. In some examples, webservers 102 and/or application servers 104 may communicate with servers within corporate data center 150 to service users. Furthermore, cloud data center 100 may host update service 106 for transmitting ACL update requests originating on application servers 104, web servers 102, and/or other devices within cloud data center 100. ACL updates may be used by devices at the corporate data center 150 to allow/deny access to various services. Update service 106 may reside on its own hardware device (e.g., a server, a router, a switch, or another hardware component) or on servers (e.g., associated with the institution). In some embodiments, update service 106 may include software (e.g., agents) that reside on servers (e.g., associated with the institution) hosted in cloud data center 100 (e.g., on web server 102 and/or any application server 104). In some embodiments, update service 106 may also include a component that resides on its own device (e.g., a server) that communicates with the agents.

Devices in cloud data center 100 may communicate with devices in corporate data center 150 via Internet 125. Corporate data center 150 may host routers (e.g., routers 152 and 154), switches (not shown), firewall 156, one or more application servers 158, and/or other IT infrastructure. Routers 152 and 154 may route data packets received from various destinations (including from cloud data center 100) to, for example, firewall 156, which may inspect the packets and send them to an appropriate destination inside corporate data center 150 (e.g., to an application server 158). Corporate data center 150 may host access control list ("ACL") controller 160. ACL controller 160 may receive ACL requests from update service 106 and process those requests accordingly. Devices at both corporate data center 150 and cloud data center 100 may have access to domain naming system ("DNS") infrastructure 120 for DNS lookups.

Computing Machine Architecture

Figure 2:
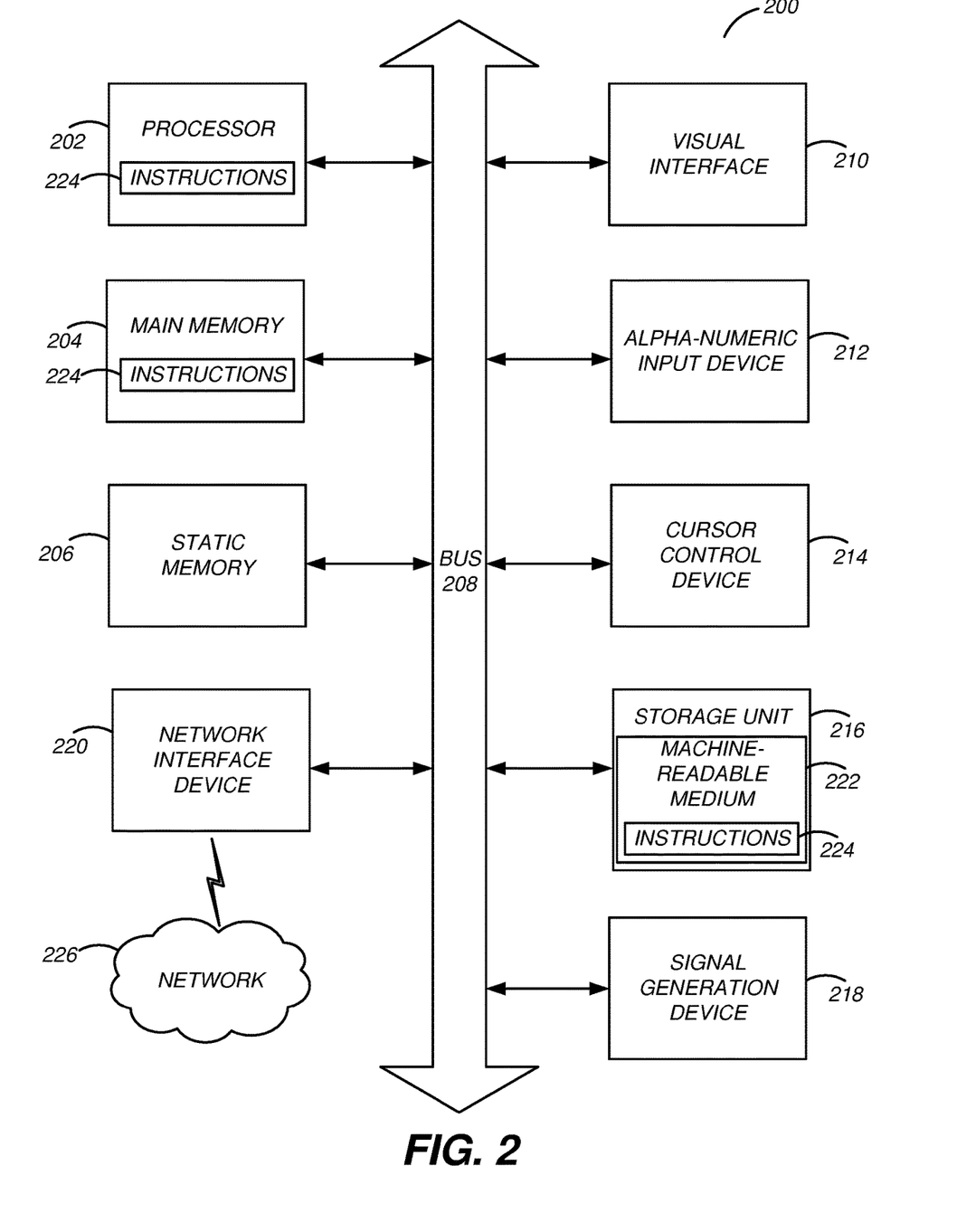
FIG. 2 is a block diagram illustrating components of an example machine able to read instructions from a machine-readable medium and execute them in a processor (or controller).

ACL controller 160, update service 106, and or other services may reside on one or more computing devices that include one or more components described in FIG. 2. FIG. 2 is a block diagram illustrating components of an example machine able to read instructions from a machine-readable medium and execute them in a processor (or controller). Specifically, FIG. 2 shows a diagrammatic representation of a machine in the example form of a computer system 200 within which program code (e.g., software) for causing the machine to perform any one or more of the methodologies discussed herein may be executed. The program code may be comprised of instructions 224 executable by one or more processors 202. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 224 (sequential or otherwise) that specify actions to be taken by that machine. Further, while only a single machine is illustrated, the term "machine" shall also be taken to include any collection of machines that individually or jointly execute instructions 224 to perform any one or more of the methodologies discussed herein.

The example computer system 200 includes a processor 202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 204, and a static memory 206, which are configured to communicate with each other via a bus 208. The computer system 200 may further include visual display interface 210. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 210 may include or may interface with a touch enabled screen. The computer system 200 may also include alphanumeric input device 212 (e.g., a keyboard or touch screen keyboard), a cursor control device 214 (e.g., a mouse, a trackball, a joystick, a motion sensor, or other pointing instrument), a storage unit 216, a signal generation device 218 (e.g., a speaker), and a network interface device 220, which also are configured to communicate via the bus 208.

The storage unit 216 includes a machine-readable medium 222 on which is stored instructions 224 (e.g., software) embodying any one or more of the methodologies or functions described herein. The instructions 224 (e.g., software) may also reside, completely or at least partially, within the main memory 204 or within the processor 202 (e.g., within a processor's cache memory) during execution thereof by the computer system 200, the main memory 204 and the processor 202 also constituting machine-readable media. The instructions 224 (e.g., software) may be transmitted or received over a network 226 via the network interface device 220.

While machine-readable medium 222 is shown in an example embodiment to be a single medium, the term "machine-readable medium" should be taken to include a single medium or multiple media (e.g., a centralized or distributed database, or associated caches and servers) able to store instructions (e.g., instructions 224). The term "machine-readable medium" shall also be taken to include any medium that is capable of storing instructions (e.g., instructions 224) for execution by the machine and that cause the machine to perform any one or more of the methodologies disclosed herein. The term "machine-readable medium" includes, but not be limited to, data repositories in the form of solid-state memories, optical media, and magnetic media.

Update Service

Figure 3:
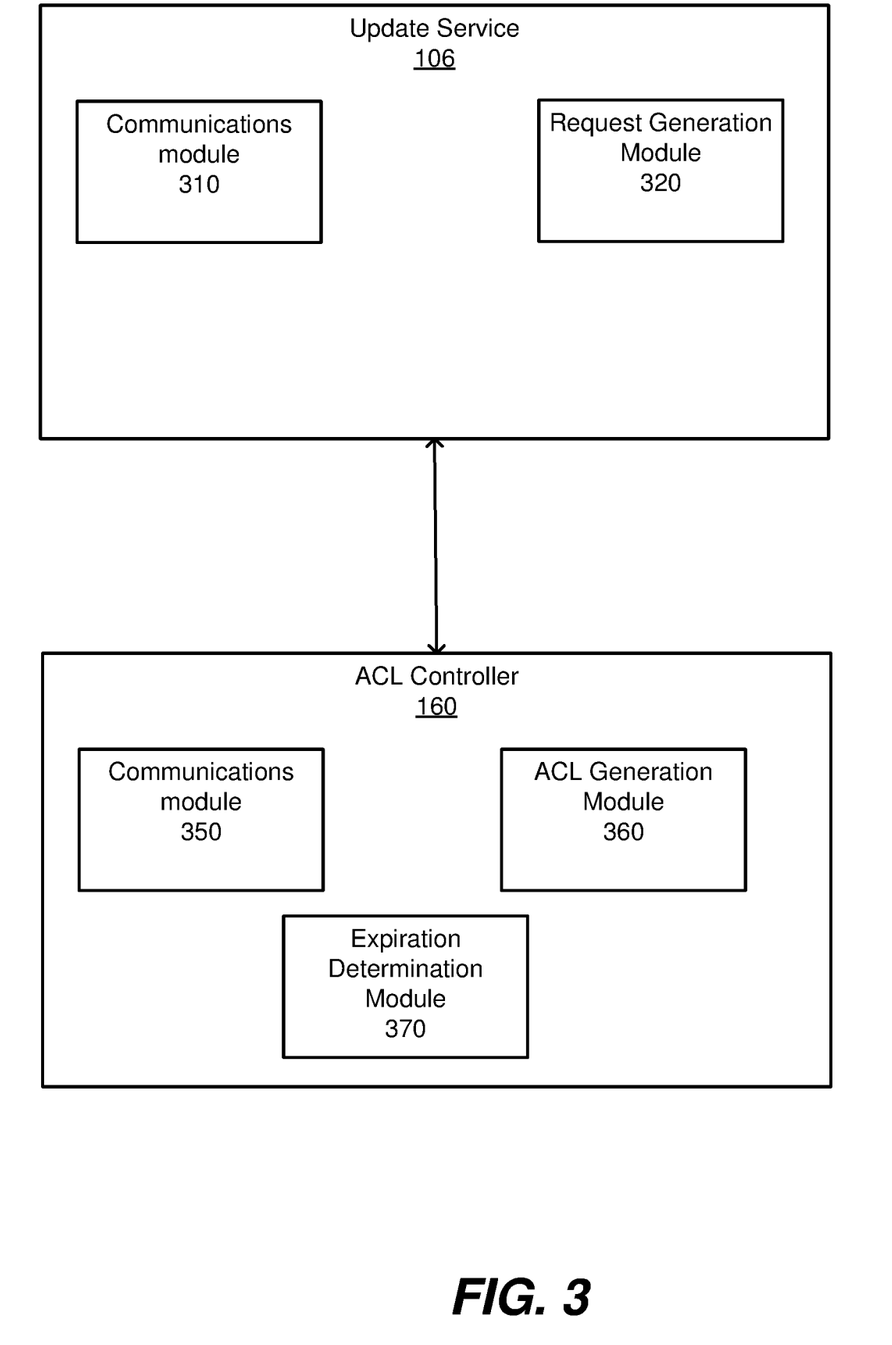
FIG. 3 illustrates exemplary modules for an update service and an access control list ("ACL") controller.

FIG. 3 illustrates exemplary modules for update service 106. In some embodiments, update service 106 may reside on a server (e.g., a physical server with one or more components shown in FIG. 2 or on a virtual server where the hardware components are shared amongst several logical servers). Update service 106 may include communications module 310, request generation module 320, and/or other modules (not shown). Communications module 310 may include software components (e.g., programming to process various communication protocols) and/or hardware components for receiving and sending information onto a network.

In some embodiments, update service 106 may communicate, through communications module 310, with software components of update service 106 installed on application servers and/or other servers (e.g., physical or virtual/logical servers) that are executing programs for a particular institution. That software is sometimes referred to as an agent. Each agent may be installed on a corresponding application server (or another device) and may be designed to detect changes within the cloud data center environment as it affects the particular server (or device) where the agent is installed. When a change is detected, the agent may communicate the change to update service 106, which processes the change and creates a request to be transmitted to ACL controller 160. In some embodiments, each agent may communicate with ACL controller 160 directly. Thus, in some embodiments, update service 106 may not have a server component. That is, each instance of update service 106 may include communications module 310 and request generation module 320 that may reside on a device associated with a configuration change (e.g., network address change).

Request generation module 320 may be configured to detect configuration updates within cloud data center 100 (e.g., network configuration/addressing changes) and generate an ACL update request. For example, an agent may detect a network address update on a server (e.g., a virtual server) that is executing the agent and based on the network address update, generate a request for an ACL to be created for that update. The request is then transmitted to ACL controller 160. In some embodiments, an agent may transmit the configuration change to a server hosting request generation module 320 of update service 106, and request generation module 320 may generate a request to be transmitted to ACL controller 160.

ACL Controller Service

Figure 4:
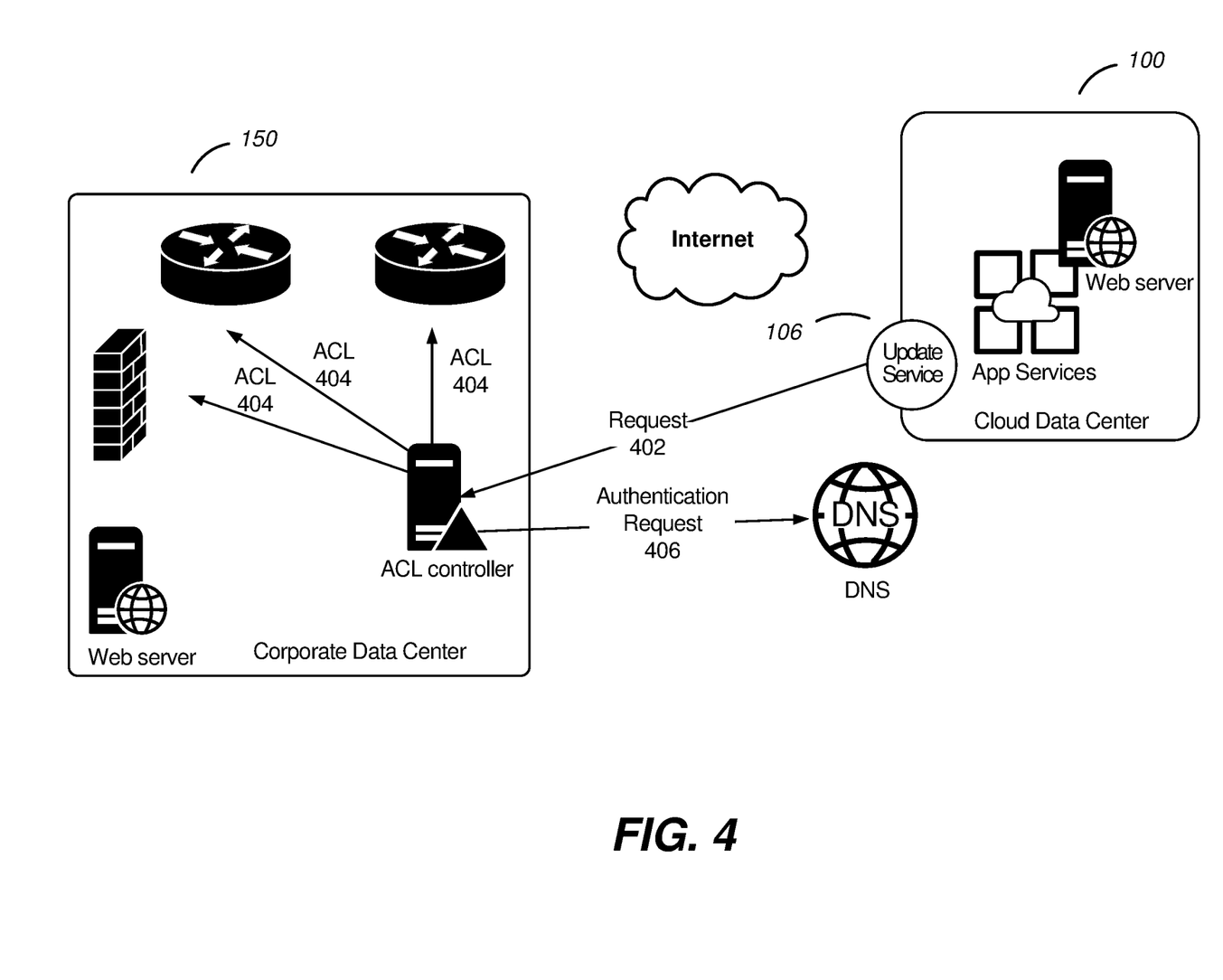
FIG. 4 illustrates various communications between components of the system.

FIG. 3 also illustrates exemplary modules for ACL controller 160. The modules of ACL controller 160 may be referred to as an access control system. The access control system on ACL controller 160 may include communications module 350, ACL generation module 360, and expiration determination module 270. More or less modules may be included in ACL controller 160. Communications module 350 may include hardware components and/or software components and may be used to communicate with update service 106 and other systems. FIG. 4 illustrates various communications between components of the system.

The access control system may receive, via communications module 350, from an update service executing in the cloud platform, request 402 (FIG. 4) to update access control permissions for a system within the cloud platform. The request may specify a network address of the system within the cloud platform. The network address of the system within the cloud platform may be generated by the cloud platform. Communications module 350 may pass the request to ACL generation module 360. In some embodiments, the request may include a data structure 500 that will be discussed in relation to FIG. 5.

ACL generation module 360 may receive the request and extract, from the request, the network address (e.g., an updated network address) of a system within the cloud platform. For example, the request may include an updated Internet Protocol address for a system within the cloud data center hosting one or more of institution's applications. In some embodiments, ACL generation module 360 may extract other information from the request. For example, if other configuration data is provided with the request, ACL generation module 360 may extract that configuration data. ACL generation module 360 may generate, using the network address, an access control list entry (e.g., ACL 404 of FIG. 4). ACL entry 404 (FIG. 4), when applied, may grant to the system within the cloud platform, permissions to access one or more systems within the data center. For example, ACL entry 404 may be a data structure that includes a network address field and/or other fields (e.g., data structure of FIG. 5). When ACL entry 404 is generated, ACL generation module 360 may pass the ACL entry to communications module 350.

Communications module 350 may send ACL entry 404 to a set of devices. The devices in the set (e.g., routers, switches, firewall, and/or other devices) allow transmission of messages received, from within the cloud data center (e.g., from the cloud platform), to a target service within the corporate data center in accordance with ACL entry 404. Each device, when receiving ACL entry 404, applies the entry to, for example, it's allowed network address table so that communications from that network address are allowed through each device.

In some embodiments, ACL controller 160 may receive and process a time-to-live parameter. For example, communications module 350 may receive, in the request, a time-to-live parameter (e.g., a number of seconds, minutes, or another suitable timing value) that indicates an amount of time for the network address to have access to the one or more systems within the data center. Communications module 350 may pass the time-to-live parameter to expiration determination module 370. Expiration determination module 370 may store the time-to-live parameter in memory, and when the time-to-live expires, the expiration determination module may generate a time-to-live expiration message. A time-to-live parameter may expire based on a value within the parameter. For example, a time-to-live parameter may include a value of a number of seconds, minutes, and/or hours after which the parameter expires. In some embodiments, the time-to-live parameter may include a date/time when the parameter expires. Expiration determination module 370 may pass the time-to-live expiration message communications module 350 to be sent to the set of devices. When each device in the set receives the time-to-live expiration message, each device may remove the ACL entry from, for example, the list of allowed network addresses.

In some embodiments, expiration determination module 370 may calculate an expiration time of the ACL entry based on the time-to-live parameter and based on determining that the expiration time of the ACL entry has been met, generate time-to-live expiration message that includes an identifier of the ACL entry. For example, the identifier of the ACL entry may be a network address for which the time to live expired. In another example, the identifier may be a unique hexadecimal value, decimal value, or another suitable value for each identifier.

In some embodiments, the ACL controller may transmit the time-to-live parameter in the ACL entry to the set of devices. For example, ACL generation module 360 may add the time-to-live parameter to the ACL entry (e.g., ACL entry 404 (FIG. 4)). ACL generation module 360 may pass the ACL entry (with the time-to-live parameter) to communications module 350. Communications module 350 may send, the ACL entry (e.g., ACL entry 404 with the time-to-live parameter) to the set of devices. Each of the set of devices may, for example, keep track of when the ACL entry expires and remove the ACL entry from the allowed list when the time-to-live parameter expires.

Figure 5:
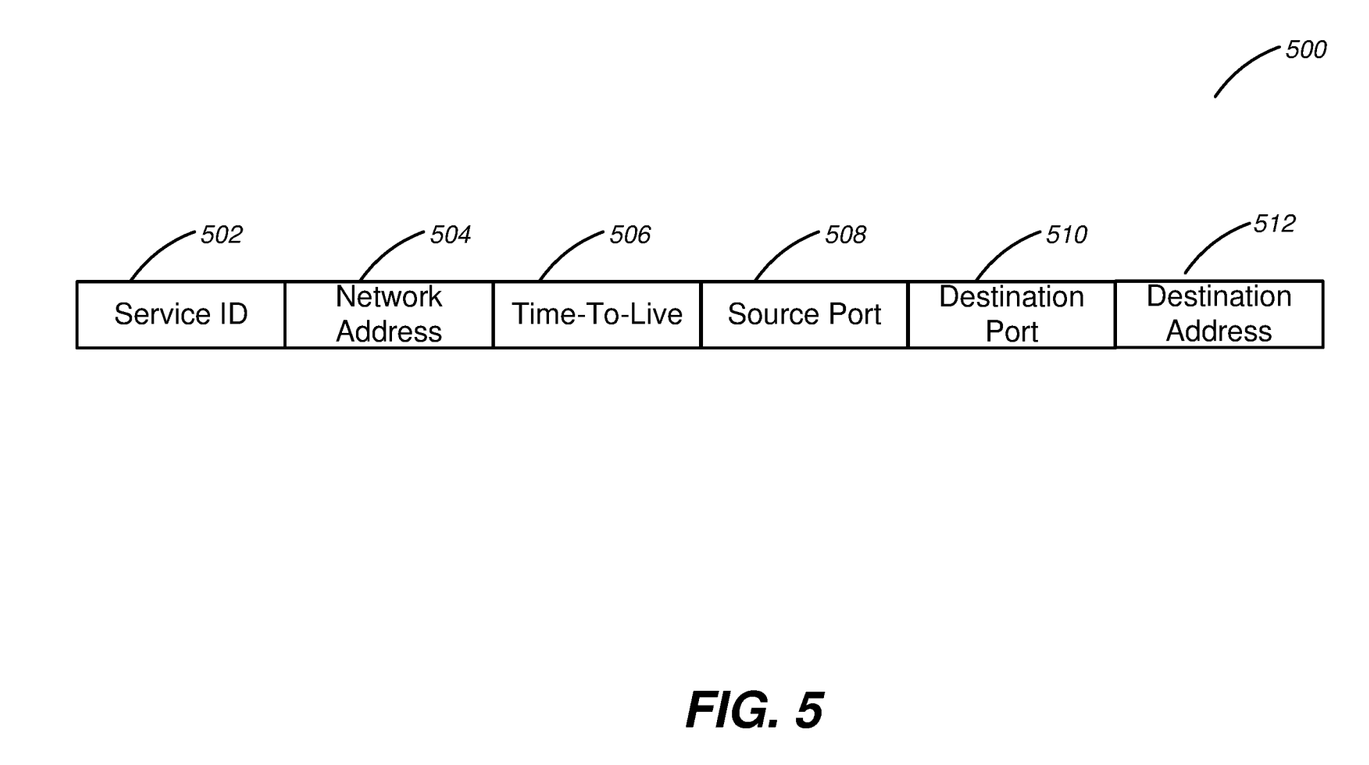
FIG. 5 illustrates a data structure representing an ACL entry.

In some embodiments, the request may also include a source port, a destination port, and/or a destination Internet Protocol address. The ACL entry may also include the source port, the destination port, and/or the destination Internet Protocol address. FIG. 5 illustrates a data structure that may be included in an ACL entry or in a request from update service 106. An ACL entry or a request from the update service may include service ID field 502 that may store a value identifying the service associated with the network address change. For example, a web service for a particular application may be associated with a change in the network address. The value may be a string, and alphanumeric value, or another suitable value. In some embodiments, the service ID field 502 may be used as an identifier in an expiration message to target an ACL entry to be removed when the time-to-live has expired.

Data structure 500 may include network address field 504 for storing a network address that needs access to the corporate data center. The network address may be an Internet Protocol address or another suitable address for network communications. In some embodiments, the network address field 504 may be used as an identifier in an expiration message to target an ACL entry to be removed when the time-to-live has expired.

Data structure 500 may include a time-to-live 506 field for storing a time-to-live value described above. In some embodiments, data structure 500 may include a field for source port 508. Source port is a Transmission Control Protocol construct that is used by sending and receiving hosts to keep track of incoming connections. That is, some computing devices may communicate over different ports for different applications. For example, packets from a first application may include a first source port and a first destination port, while packets from a different application may include a second source port and a second destination port. Thus, data structure 500 may include destination port 510. In some embodiments, data structure 500 may include a field for destination address 512. Destination address 512 field may store an address for which traffic should be allowed from the network address in the ACL. That is, if communications are coming from the network address to a different destination address, those communications may be blocked.

In some embodiments, ACL controller 160 may perform authentication of the request. ACL controller 160 may perform authentication using ACL generation module 360 and/or a dedication authentication module (not shown). ACL controller 160 may extract a domain value from the request. The domain value may correspond to the update service executing in the cloud platform. In some embodiments, the domain value may be included in the header of the request and may identify a server (e.g., a physical server or a virtual/logical server) or another device.

ACL controller 160 may compare the domain value to domain values in a list of trusted domains. For example, ACL controller 160 may transmit an authentication request 406 (FIG. 4) to the DNS system for one or more trusted domains (e.g., servers). ACL controller 160 may drop the request based on determining that the domain value is not in the list of trusted domains. That is, if the update service requesting the update is not trusted, ACL controller 160 will not generate and send an ACL entry in response the request. In some embodiments, the request (e.g., request 402) may be authenticated using a signature (e.g., private key encryption signature). That is, ACL controller 160 may determine, using a signature included in the request, whether the request is valid, and based on determining that the request is not valid, drop the request. For example, if an agent is communicating with ACL controller 160 the agent may sign the request with a private key assigned to the agent's device. ACL controller 160 may determine the authenticity of the request by decrypting the signature with the public key of the agent's device.

ACL Controller Process

Figure 6:
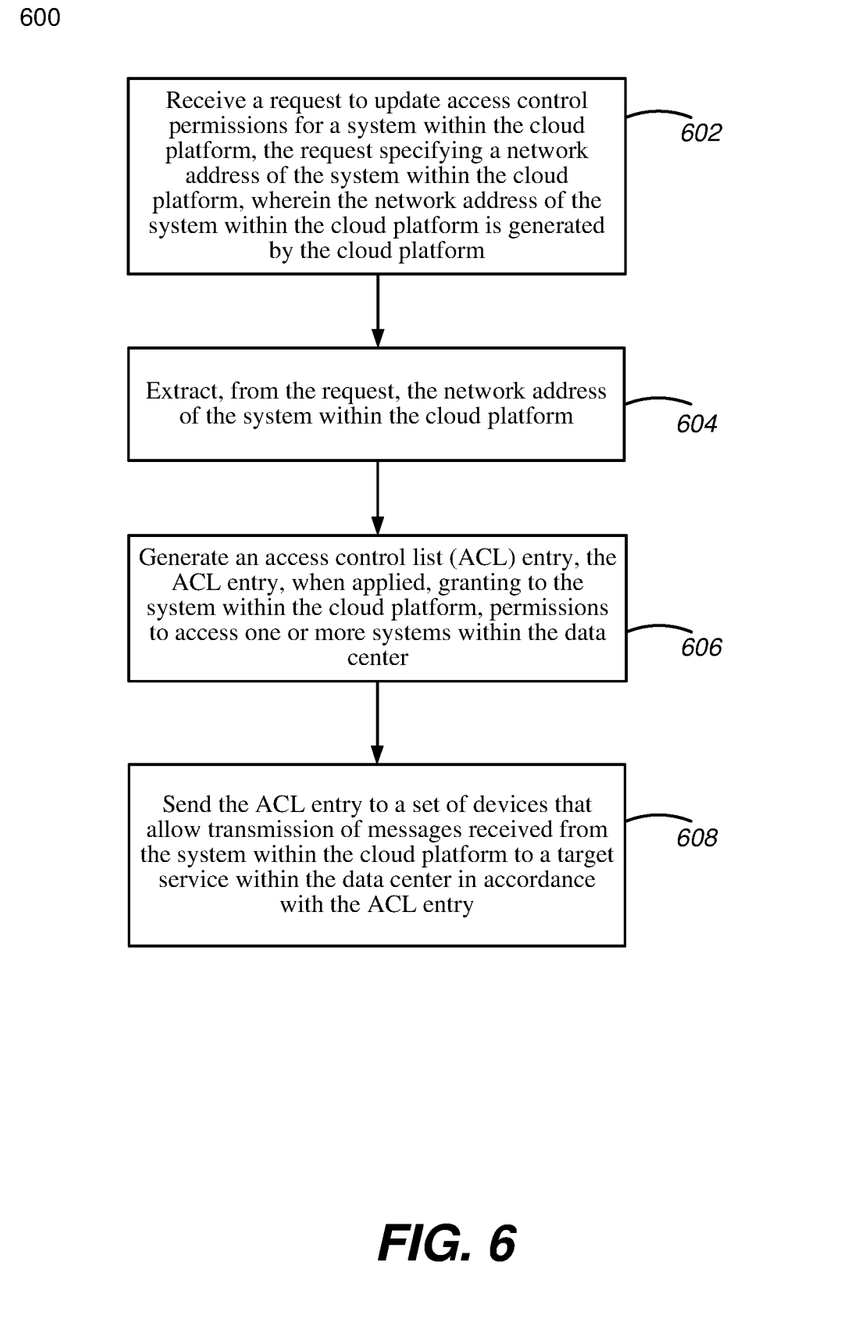
FIG. 6 illustrates actions that an ACL controller may perform to enable communications between systems in first-party and third-party data centers.

FIG. 6 illustrates actions that ACL controller 160 may perform to enable communications between systems in first-party and third-party data centers. At 602, the ACL controller receives a request to update access control permissions for a system within the cloud platform, the request specifying a network address of the system within the cloud platform, wherein the network address of the system within the cloud platform is generated by the cloud platform. For example, ACL controller 160 may receive a request as described above.

At 604, the ACL controller extracts, from the request, the network address of the system within the cloud platform. For example, the ACL controller may extract an Internet Protocol address from the request. In some embodiments, as described above, the ACL controller may extract other information from the request (e.g., values described in relation to data structure 500).

At 606, the ACL controller generates an access control list (ACL) entry, the ACL entry, when applied, granting to the system within the cloud platform, permissions to access one or more systems within the data center. The ACL entry may include a data structure as described above (e.g., data structure 500). At 608, the ACL controller sends the ACL entry to a set of devices that allow transmission of messages received from the system within the cloud platform to a target service within the data center in accordance with the ACL entry. That is, devices in a first-party data center allow communication from the network address in the third-party data center based on the ACL entry.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for enabling access control to be performed on messages received in a data center from a cloud platform through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method for enabling access control to be performed on messages received in a data center from a cloud platform, the method comprising:
   executing an access control system in the data center and an update service in the cloud platform;
   receiving, by the access control system within the data center, from the update service executing in the cloud platform, a request to update access control permissions for a system within the cloud platform, the request specifying a network address of the system within the cloud platform, wherein the network address of the system within the cloud platform is generated by the cloud platform;
   extracting from the request, by the access control system, the network address of the system within the cloud platform;
   generating, by the access control system using the network address, an access control list (ACL) entry, the ACL entry, when applied, granting to the system within the cloud platform, permissions to access one or more systems within the data center; and
   sending, by the access control system, the ACL entry to a set of devices, wherein one or more devices in the set of devices allow transmission of messages received from the system within the cloud platform to a target service within the data center in accordance with the ACL entry.

2. The method of claim 1, further comprising:
   receiving, in the request, a time-to-live parameter that indicates an amount of time for the network address to have access to the one or more systems within the data center,
   storing the time-to-live parameter in memory; and
   sending, by the access control system, to the set of devices a time-to-live expiration message when the time-to-live expires.

3. The method of claim 2, further comprising:
   calculating an expiration time of the ACL entry based on the value of the time-to-live parameter; and
   based on determining that the expiration time of the ACL entry has been met, generating the time-to-live expiration message, wherein the time-to-live expiration message comprises an identifier of the ACL entry.

4. The method of claim 1, wherein the request further comprises one or more of a source port, a destination port, or a destination Internet Protocol address.

5. The method of claim 1, further comprising:
   extracting a domain value from the request, wherein the domain value corresponds to the update service executing in the cloud platform;
   comparing the domain value to domain values in a list of trusted domains; and
   dropping the request based on determining that the domain value is not in the list of trusted domains.

6. The method of claim 1, wherein the ACL entry comprises one or more fields that store an Internet Protocol address, a time-to-live value, an identifier of the update service, an address of the update service, one or more source ports, one or more target ports, and one or more destination Internet Protocol addresses.

7. The method of claim 1, further comprising:
   determining, using a signature included in the request, whether the request is valid; and
   based on determining that the request is not valid, dropping the request.

8. A system for enabling access control to be performed on messages received in a data center from a cloud platform, the system comprising:
   memory with instructions encoded thereon; and
   one or more processors that, when executing the instructions, are caused to perform operations comprising:
   executing an access control system in a data center and an update service in a cloud platform;
   receiving, by the access control system within the data center, from the update service executing in the cloud platform, a request to update access control permissions for a system within the cloud platform, the request specifying a network address of the system within the cloud platform, wherein the network address of the system within the cloud platform is generated by the cloud platform;
   extracting from the request, by the access control system, the network address of the system within the cloud platform;
   generating, by the access control system using the network address, an access control list (ACL) entry, the ACL entry, when applied, granting to the system within the cloud platform, permissions to access one or more systems within the data center; and
   sending, by the access control system, the ACL entry to a set of devices, wherein one or more devices in the set of devices allow transmission of messages received from the system within the cloud platform to a target service within the data center in accordance with the ACL entry.

9. The system of claim 8, wherein the instructions cause the one or more processor to perform operations comprising:
   receiving, in the request, a time-to-live parameter that indicates an amount of time for the network address to have access to the one or more systems within the data center,
   storing the time-to-live parameter in memory; and
   sending, by the access control system, to the set of devices a time-to-live expiration message when the time-to-live expires.

10. The system of claim 9, wherein the instructions cause the one or more processor to perform operations comprising:
    calculating an expiration time of the ACL entry based on the value of the time-to-live parameter; and
    based on determining that the expiration time of the ACL entry has been met, generating the time-to-live expiration message, wherein the time-to-live expiration message comprises an identifier of the ACL entry.

11. The system of claim 8, wherein the request further comprises one or more of a source port, a destination port, or a destination Internet Protocol address.

12. The system of claim 8, wherein the instructions cause the one or more processor to perform operations comprising:

extracting a domain value from the request, wherein the domain value corresponds to the update service executing in the cloud platform;

comparing the domain value to domain values in a list of trusted domains; and dropping the request based on determining that the domain value is not in the list of trusted domains.

13. The system of claim 8, wherein the ACL entry comprises one or more fields that store an Internet Protocol address, a time-to-live value, an identifier of the update service, an address of the update service, one or more source ports, one or more target ports, and one or more destination Internet Protocol addresses.

14. The system of claim 8, wherein the instructions cause the one or more processor to perform operations comprising:

determining, using a signature included in the request, whether the request is valid; and based on determining that the request is not valid, dropping the request.

15. A non-transitory computer readable medium storing instructions, the instructions when executed by one or more processors cause the one or more processors to:

execute an access control system in a data center and an update service in a cloud platform;

receive, by the access control system within the data center, from the update service executing in the cloud platform, a request to update access control permissions for a system within the cloud platform, the request specifying a network address of the system within the cloud platform, wherein the network address of the system within the cloud platform is generated by the cloud platform;

extract from the request, by the access control system, the network address of the system within the cloud platform;

generate, by the access control system using the network address, an access control list (ACL) entry, the ACL entry, when applied, granting to the system within the cloud platform, permissions to access one or more systems within the data center; and send, by the access control system, the ACL entry to a set of devices, wherein one or more devices in the set of devices allow transmission of messages received from the system within the cloud platform to a target service within the data center in accordance with the ACL entry.

16. The non-transitory computer readable medium of claim 15, further comprising stored instructions that cause the one or more processors to:

receive, in the request, a time-to-live parameter that indicates an amount of time for the network address to have access to the one or more systems within the data center, store the time-to-live parameter in memory; and send, by the access control system, to the set of devices a time-to-live expiration message when the time-to-live expires.

17. The non-transitory computer readable medium of claim 16, further comprising stored instructions that cause the one or more processors to:

calculate an expiration time of the ACL entry based on the value of the time-to-live parameter; and based on determining that the expiration time of the ACL entry has been met, generate the time-to-live expiration message, wherein the time-to-live expiration message comprises an identifier of the ACL entry.

18. The non-transitory computer readable medium of claim 15, wherein the request further comprises one or more of a source port, a destination port, or a destination Internet Protocol address.

19. The non-transitory computer readable medium of claim 15, further comprising stored instructions that cause the one or more processors to:

extract a domain value from the request, wherein the domain value corresponds to the update service executing in the cloud platform;

compare the domain value to domain values in a list of trusted domains; and drop the request based on determining that the domain value is not in the list of trusted domains.

20. The non-transitory computer readable medium of claim 15, wherein the ACL entry comprises one or more fields that store an Internet Protocol address, a time-to-live value, an identifier of the update service, an address of the update service, one or more source ports, one or more target ports, and one or more destination Internet Protocol addresses.

* * * * *